(12) United States Patent
Hoptroff

(10) Patent No.: US 12,341,603 B2
(45) Date of Patent: Jun. 24, 2025

(54) SYSTEMS AND METHODS FOR TESTING TIME DISTRIBUTION

(71) Applicant: HOPTROFF LONDON LIMITED, London (GB)

(72) Inventor: Richard Hoptroff, London (GB)

(73) Assignee: Hoptroff London Limited, London (GB)

( * ) Notice: Subject to any disclaimer, the term of this patent is extended or adjusted under 35 U.S.C. 154(b) by 283 days.

(21) Appl. No.: 17/379,467

(22) Filed: Jul. 19, 2021

(65) Prior Publication Data

US 2022/0006547 A1 Jan. 6, 2022

Related U.S. Application Data

(63) Continuation of application No. PCT/US2020/014119, filed on Jan. 17, 2020.

(30) Foreign Application Priority Data

Jan. 21, 2019 (GB) ...................... 1900789

(51) Int. Cl.
*H04J 3/06* (2006.01)
*G06F 1/08* (2006.01)
(Continued)

(52) U.S. Cl.
CPC .............. *H04J 3/0667* (2013.01); *G06F 1/08* (2013.01); *G06F 1/14* (2013.01); *H04L 69/28* (2013.01)

(58) Field of Classification Search
CPC ......... H04J 3/0667; H04J 3/0673; G06F 1/08; G06F 1/14; H04L 69/28
See application file for complete search history.

(56) References Cited

U.S. PATENT DOCUMENTS

| 8,594,134 B2 | 11/2013 | Zampetti et al. |
| 9,001,951 B1 * | 4/2015 | Kumpulainen ....... H04J 3/0697 327/147 |

(Continued)

FOREIGN PATENT DOCUMENTS

| EP | 3270531 A1 | 1/2018 |
| JP | 2016152488 A * | 8/2016 |

(Continued)

OTHER PUBLICATIONS

Ferrant et al. Synchronous Ethernet and IEEE 1588 in Telecoms, John Wiley & Sons, Inc. 2013 (Year: 2013).*

(Continued)

*Primary Examiner* — Ayaz R Sheikh
*Assistant Examiner* — David Zhijun Sun
(74) *Attorney, Agent, or Firm* — Wilson Sonsini Goodrich & Rosati

(57) ABSTRACT

The present disclosure provides systems and methods for testing time distribution in a network. The method comprises: receiving, at a time receiver, a first time signal transmitted along a first transmission pathway between the time receiver and a time server, the first time signal is provided by a first clock of the time serve; receiving a second time signal transmitted along a second transmission pathway, the second transmission pathway is different from the first transmission pathway; deriving a first time offset between the first time signal and a corresponding arrival time generated by a second clock of the time receiver, and a second time offset between the second time signal and a corresponding arrival time generated by the second clock; and determining an estimated error of distributing time along the first transmission path based on a difference between the first time offset and the second time offset.

20 Claims, 8 Drawing Sheets

(51) Int. Cl.
*G06F 1/14* (2006.01)
*H04L 69/28* (2022.01)

(56) References Cited

U.S. PATENT DOCUMENTS

| | | | |
|---|---|---|---|
| 9,705,770 | B2 | 7/2017 | Cavaliere et al. |
| 10,142,088 | B2 | 11/2018 | Liu |
| 2013/0208735 | A1* | 8/2013 | Mizrahi ............... H04J 3/0664 370/503 |
| 2015/0071309 | A1 | 3/2015 | Aweya et al. |
| 2015/0295669 | A1 | 10/2015 | Chapman et al. |
| 2016/0073365 | A1 | 3/2016 | Klockar |
| 2016/0080100 | A1 | 3/2016 | Yan et al. |
| 2016/0105341 | A1* | 4/2016 | Cavaliere ........... H04Q 11/0066 398/33 |
| 2016/0173352 | A1* | 6/2016 | Danielsson ......... H04L 63/1408 370/252 |
| 2016/0238999 | A1 | 8/2016 | Dougan et al. |
| 2017/0302392 | A1 | 10/2017 | Farra et al. |
| 2018/0145823 | A1 | 5/2018 | Seo et al. |
| 2019/0081720 | A1 | 3/2019 | Barry et al. |

FOREIGN PATENT DOCUMENTS

| | | | |
|---|---|---|---|
| KR | 1020080101503 A | 11/2008 | |
| KR | 101697059 B1 | 1/2017 | |
| WO | WO-2017107261 A1 * | 6/2017 | ............ H04J 3/0667 |
| WO | WO-2020154199 A1 | 6/2020 | |

OTHER PUBLICATIONS

GB1900789.7 Examination Report dated Jul. 12, 2019.
Novick et al. Examination of Time and Frequency Control Across Wide Area Networks Using IEEE-1588v2 Unicast Transmissions. NIST(1-6).
PCT/US2020/014119 Search Report & Written Opinion dated May 27, 2020.
EP20745488.5 Search Report and Opinion dated Oct. 12, 2022.

* cited by examiner

SYSTEMS AND METHODS FOR TESTING TIME DISTRIBUTION

CROSS-REFERENCE

This application is a continuation of International Application No. PCT/US2020/014119, filed Jan. 17, 2020, which claims priority to GB Application No. 1900789.7 filed on Jan. 21, 2019, each of which is entirely incorporated herein by reference.

BACKGROUND

There is an increasing need for the clocks on computers to synchronize with each other, and by extension, synchronize with trusted time sources (e.g., NPL (Teddington), NIST (Boulder, Colo.), Rosstandart (Moscow), etc.). An example is MiFID II directive RTS 25, which requires that timestamps used to record financial transactions with a time accuracy within specified bounds.

In some scenarios, Ethernet may be considered to be a transmission pathway for disseminating time information. For instance, time signals from global navigational satellites systems ("GNSS") such as GPS or GLONASS may be received using a grandmaster clock with holdover capability in the case that the GNSS signal is temporarily lost. This time information is then disseminated to computers over the Ethernet with the Ethernet functioning as a transmission pathway between a plurality of nodes of the network (e.g., grandmaster clock and the computers) for transmitting the time information.

Time information can be disseminated or distributed to computers over the Ethernet using standard protocols. The standard protocols may be timing and synchronization standards such as Network Time Protocol ("NTP") and Precision Time Protocol ("PTP"). The PTP and NTP protocol are generally packet-based methods that transfer time and frequency references using packets containing time stamps that identify the times of departure/arrival of packets. PTP and NTP can distribute timing and frequency alignment throughout a network in a point-to-point fashion. The clocks in a network are typically organized into a master-slaves hierarchy, and clock synchronization messages are communicated among nodes to synchronize all slave clocks with a master clock. The delay spent in carrying a master clocks time stamp to a slave clock may then affect the accuracy of clock synchronization. Both PTP and NTP compensate for the delay incurred by transmission over the Ethernet by sending a timed message in both directions, allowing a round-trip delay to be measured. However, such delay is measured based on the assumption that the delay is the same in both directions, i.e. the Ethernet latency is symmetric, the one-way delay can be calculated as half the round-trip time and the remote computer's clock can be accurately set. This means that any asymmetry in the network would significantly impact the performance of the delivered time synchronization reference or determination of the time transmission accuracy.

SUMMARY

Recognized herein is a need for methods and systems for testing time distribution across a network. In particular, the provided methods and systems may be capable of testing and determining whether time has been correctly delivered to a remote site without the need to visit the remote site. Additionally, the present disclosure provides methods and systems for generating an estimated error of time accuracy due to propagation delay in a network. In some cases, the estimated error of time accuracy may be used as a threshold to determine whether time has been distributed correctly.

In an aspect, a method is provided for testing time distribution over a network. The method may comprise: receiving, at a time receiver, a first time signal transmitted along a first transmission pathway between the time receiver and a time server, wherein the first time signal is provided by a first clock of the time serve; receiving, at the time receiver, a second time signal transmitted along a second transmission pathway, wherein the second transmission pathway is different from the first transmission pathway; deriving, by the time receiver, a first time offset between the first time signal and a corresponding arrival time generated by a second clock of the time receiver, and a second time offset between the second time signal and a corresponding arrival time generated by the second clock; and determining an estimated error of distributing time along the first transmission path based on a difference between the first time offset and the second time offset.

In some embodiments, the first time signal is a GNSS or GPS time signal. In some embodiments, the first clock comprises a plurality of grandmaster clocks. In some cases, the first time signal or the second time signal comprises a first set of time data or a second set of time data generated by the plurality of grandmaster clocks. In some instances, the first time offset or the second time offset is an average value calculated based on the first set of time data or the second set of time data.

In some embodiments, the second clock of the time receiver is a slave clock synchronized with the first clock. In some embodiments, the second transmission pathway comprises a plurality of sub-pathways connected by one or more intermediate node devices. In some cases, at least one of the one or more intermediate node devices comprises a forward mechanism for forwarding the second time signal along the second transmission pathway. In some cases, at least one of the one or more intermediate node devices comprises a grandmaster clock and the second time signal is provided by the grandmaster clock. In some embodiments, the first time signal or the second time signal is received using a PTP or NTP protocol.

In another aspect, a system for testing time distribution in a network is provided. The system may comprise (a) a memory for storing a set of instructions; and (b) one or more processors configured to execute the set of instructions to: (i) receive a first time signal transmitted along a first transmission pathway between a time receiver and a time server, wherein the first time signal is provided by a first clock of the time server; (ii) receive a second time signal transmitted along a second transmission pathway, wherein the second transmission pathway is different from the first transmission pathway; (iii) derive a first time offset between the first time signal and a corresponding arrival time generated by a second clock, and a second time offset between the second time signal and a corresponding arrival time generated by the second clock; and (iv) determine an estimated error of distributing time along the first transmission path based on a difference between the first time offset and the second time offset.

In some embodiments, the first time signal is a GNSS or GPS time signal. In some embodiments, the first clock comprises a plurality of grandmaster clocks. In some cases, the first time signal or the second time signal comprises a first set of time data or a second set of time data generated by the plurality of grandmaster clocks. In some instances, the first time offset or the second time offset is an average value calculated based on the first set of time data or the second set of time data.

In some embodiments, the second clock is a slave clock synchronized with the first clock. In some embodiments, the second clock is a slave clock at the time receiver. In some embodiments, the second transmission pathway comprises a plurality of sub-pathways connected by one or more intermediate node devices. In some cases, at least one of the one or more intermediate node devices comprises a forward mechanism for forwarding the second time signal along the second transmission pathway. In some instances, the second time signal is provided by at least one of the one or more intermediate node devices. For example, the at least one intermediate node device comprises a plurality of grandmaster clocks. In some embodiments, the first time signal or the second time signal is received using a PTP or NTP protocol.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
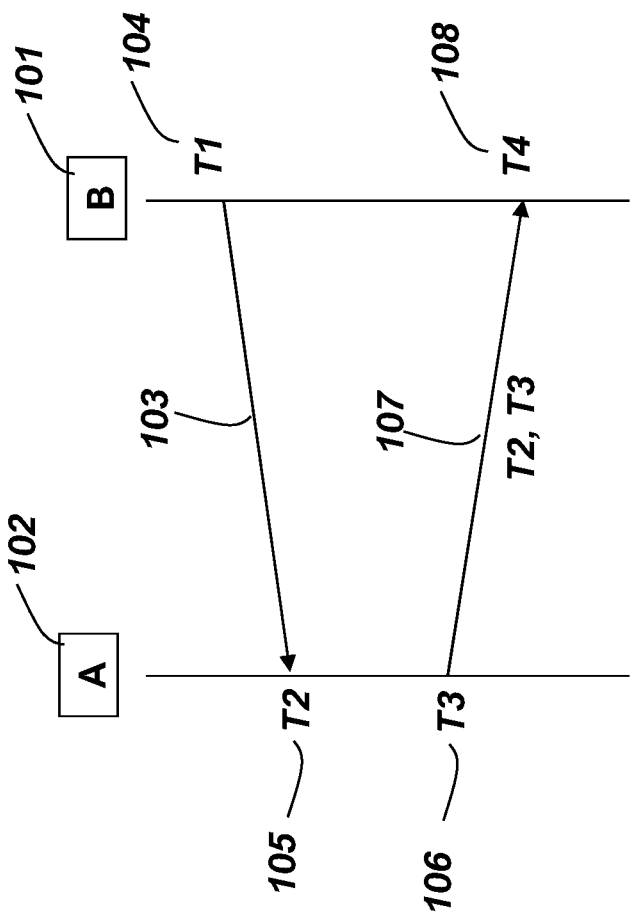
FIG. 1 schematically shows an example of measuring a one-way transmission delay based on NTP protocol.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a virtual local area network (VLAN), a wireless LAN (WLAN), a metropolitan area network (MAN), a wireless MAN (WMAN), a wide area network (WAN), a wireless WAN (WWAN), a personal area network (PAN), a wireless PAN (WPAN), a virtual private network (VPN), a storage area network (SAN), a frame relay connection, an Advanced Intelligent Network (AIN) connection, a synchronous optical network (SONET) connection, devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

As mentioned above, when time synchronization is requested, a two-way timing protocol (e.g. Network Time Protocol (NTP) or Precision Time Protocol (PTP)) may be used for time dissemination. The delay in carrying a master clocks time stamp to a slave clock may be calculated to ensure the accuracy of clock synchronization. The transfer delay along a transmission path such as a path from master to slave may be calculated using the NTP or PTP approach. However, one fundamental assumption with this approach is that the delay from master to slave and from slave to master shall be identical. This means that any asymmetry in the network would significantly impact the performance of the delivered time synchronization reference.

FIG. 1 schematically shows an example of measuring a one-way transmission delay based on NTP protocol. Similar discussion applies with other protocols such as PTP. The one-way transmission delay may be measured for a transmission path between a time server node 102 and a time receiver node 101. The time server node and the time receiver node can be any suitable network components. For instance, the time server A and time receiver B may be nodes of a communication network and a propagation delay may be determined for a one-way transmission from time server A to time receiver B. In some cases, time server A may be capable of receiving time signals from global navigational satellites systems ("GNSS") such as GPS or GLONASS using a grandmaster clock. The time receiver B may comprise slave clock to be synchronized with the grandmaster clock or to receive a time service. A time server may also be referred to as time source which are used interchangeably throughout the specification unless context suggests otherwise.

In the illustrated example, a time receiver B 101 timestamps 104 ($T_1$) a packet, at which it is sent. The packet along with the timestamp $T_1$ is transmitted 103 to time server A 102. When the packet is received, time server A 102 timestamps its arrival time 105 ($T_2$). Time server A 102 then timestamps 106 ($T_3$) a packet 107 it transmits to a server along with the value $T_2$. When the packet is received at time receiver B 101, it is timestamped 108 ($T_4$) as the arrival time. Time server A conveys to the time receiver B the timestamps $T_2$, $T_3$ by embedding it in the packet. Time receiver B 101 then has all four timestamps $T_1$, $T_2$, $T_3$, $T_4$ and computes the round-trip time $T_{ABA}$ as follows:

$$T_{ABA}=(T_4-T_1)-(T_3-T_2)$$

If the assumption is made that the Ethernet latency is symmetric, i.e. messages from A to B take the same time to travel as messages from B to A, the one-way delay may be measured as:

$$T_{BA}=T_{ABA}/2$$

the clock on time receiver B 101 may be adjusted such that the measured clock time difference Δ:

$$\Delta=T_3+T_{BA}-T_4$$

is as close to zero as possible. With NTP, which implements this in software, accuracies of microseconds can be achieved. With PTP, which provides for hardware timestamping using follow-up messages, but is otherwise similar, sub-microsecond accuracies can be achieved.

However, the limitation of the aforementioned approach is that Ethernet connections cannot be assumed to be symmetric for many reasons. These include bandwidth changes within the network and routing asymmetries. Suppose the AB latency is 2E slower than the BA latency. The apparent one-way latency $T'_{AB}$ is calculated as follows $$(T_4-T_3)=(T_2-T_1)+2E$$

$$T_{ABA}=2(T_4-T_3+E)$$

$$T'_{AB}=T_4-T_3+E$$

An error of E is introduced due to the assumption that the Ethernet latency is symmetric. This error may be caused by asymmetric delays or asymmetric network congestion status on the round-trip path between the two nodes, the approximated one-way delay can differ significantly from the actual one-way delay. Even if the variation of the one-way delay is removed under well-controlled network congestion, the approximated one-way delay still cannot be used in place of the constant one-way delay under asymmetric network path delays. The unknown value of a constant one-way delay makes it impossible to find out the relative offset between two clocks.

In order to determine the extent of such asymmetries, the state of the art is to test the transmission by causing a hardware event at the receiving device, such as a positive-going pulse at the start of each second ("pulse-per-second" or "PPS"), and comparing this with an independent time source such as a local GPS receiver.

Figure 2:
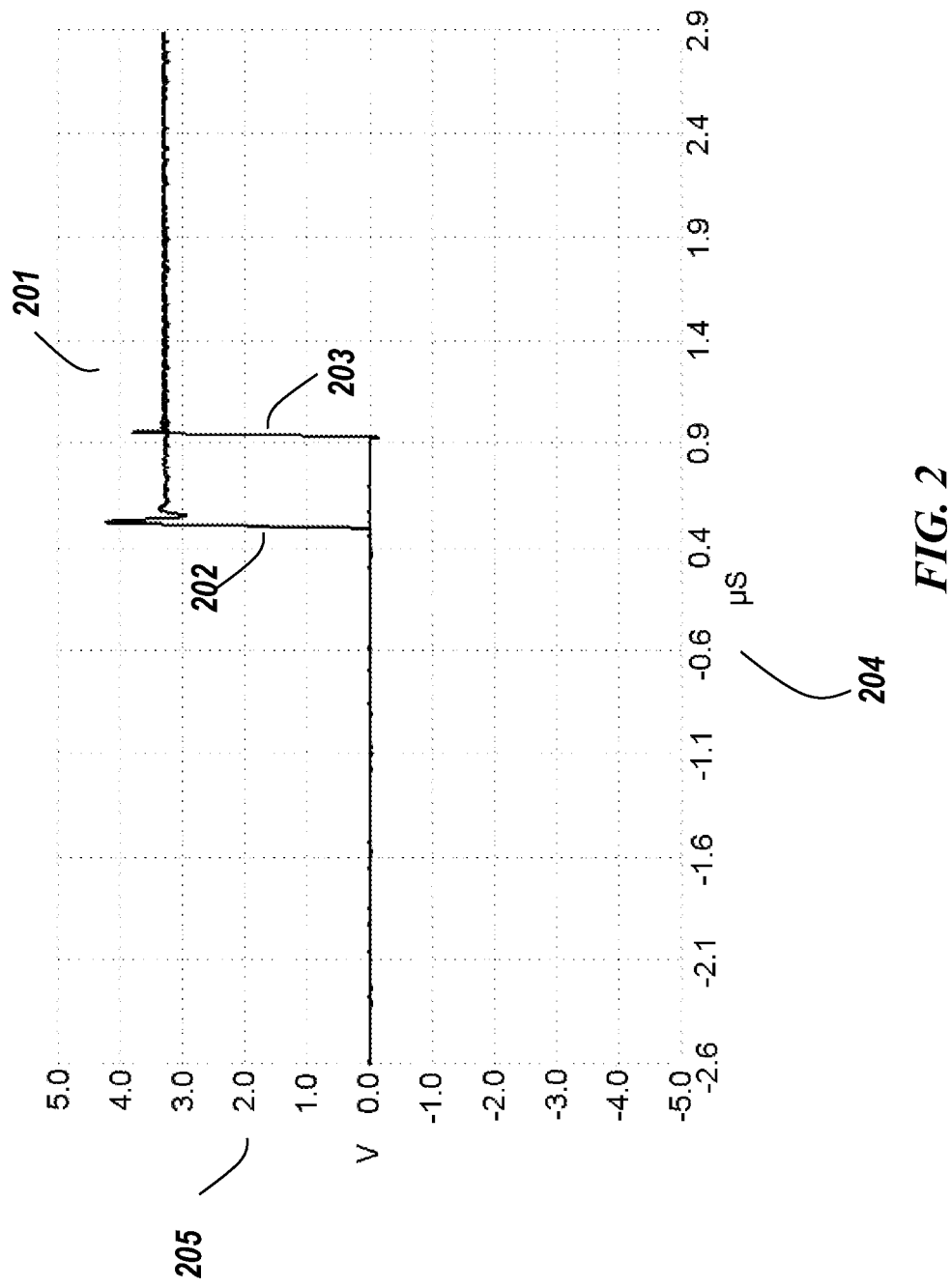
FIG. 2 shows an example method of testing transmission accuracy.

FIG. 2 shows an existing method for testing the transmission accuracy. As shown in the example, the oscilloscope 201 where rising edge of receiving device PPS 202 is compared with the PPS of an independent source 203 and the measured asymmetry is approximately +400 ns. This method for testing the transmission delay may have a good performance over short distances such as within an office building or data center. However, such method may be limited because the oscillator (or FLL or PLL) circuit may have its PPS matched precisely to a reference PPS, but there is no indication of precise time nor time scale (that is, PPS marks the passing of a second, but not what particular second it may be). Moreover, such method may not work well over longer distances given that it requires hardware set up and monitored at the time receiver nodes which can be located long-distance away from one another (e.g., time signal transmitted from London to hundreds of locations across Europe).

Figure 3:
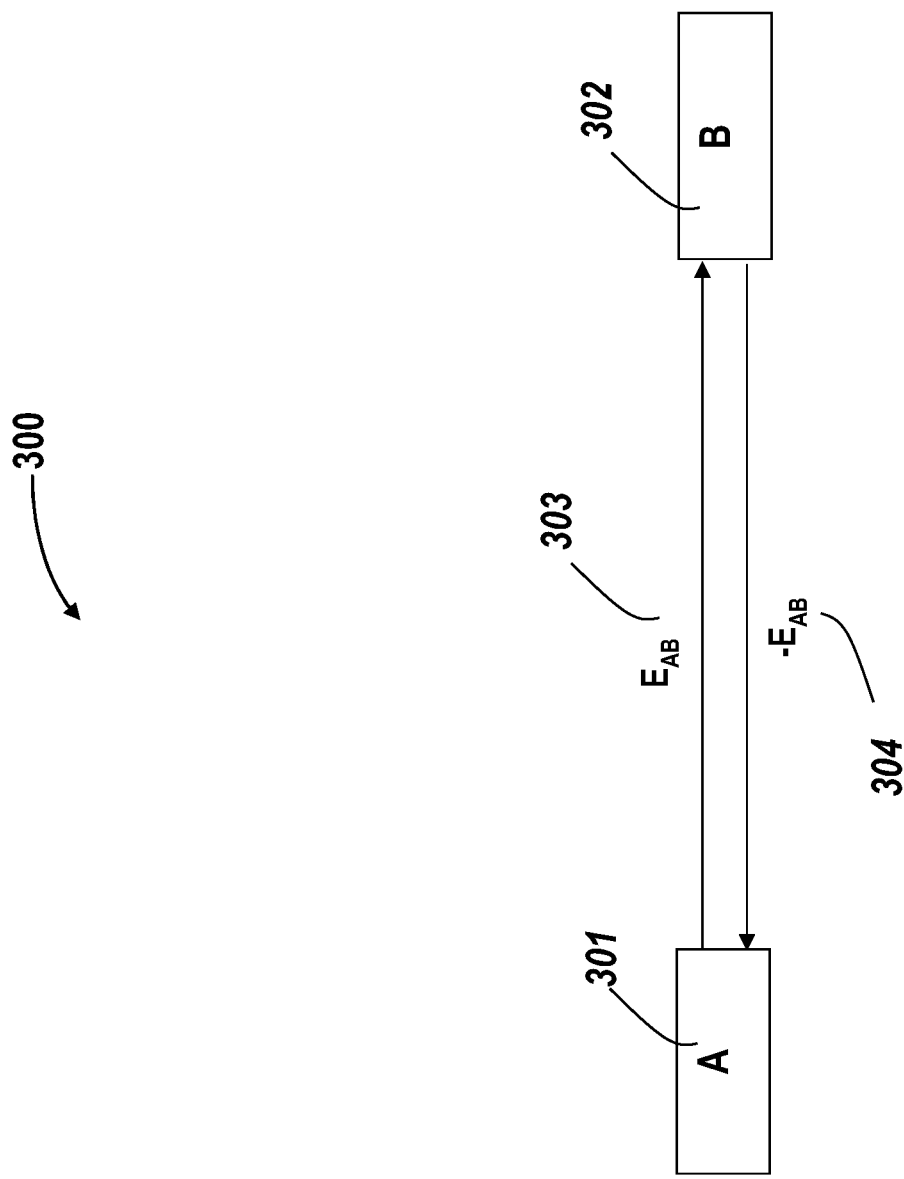
FIG. 3 schematically illustrates an example of distributing time along a transmission pathway.

FIG. 3 schematically illustrates an example 300 of distributing time along a transmission path. In the illustrated example, a PTP or NTP time signal 303 is transmitted from time source A 301 in London to receiver B 302 in Frankfurt. The asymmetry error E may not be accurately measured if using a new PTP signal sent back to the time source A from the receiver B 304 because the transmission delay in one direction 303 can be cancelled out by the return path 304:

$$E_{ABA}=E_{AB}-E_{AB}=0$$

The present disclosure provides methods and systems for estimating the error in accuracy due to path asymmetry from a time source to a time receiver using an alternative approach. In particular, the provided methods and systems may advantageously provide an estimated transmission delay error without requiring additional hardware set up or maintenance at the receiver end.

Figure 4:
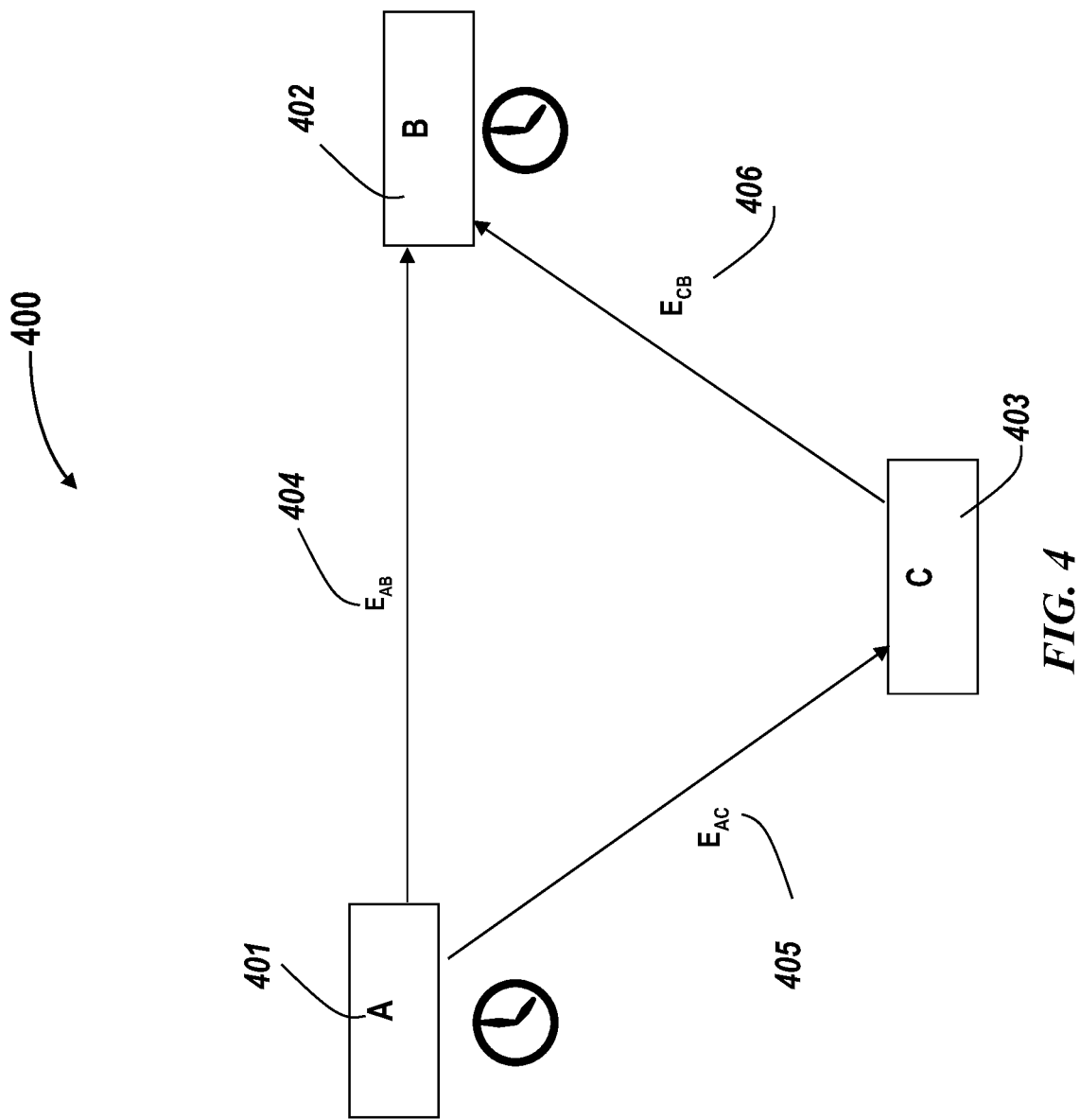
FIG. 4 schematically shows a diagram of a method for estimating an error in transmission delay, in accordance with various embodiments of the invention.

FIG. 4 schematically shows a diagram of a method 400 for estimating an error in transmission delay, in accordance with various embodiments of the invention. The error in time accuracy along a transmission pathway from a time source node A 401 to a time receiver node B may be calculated. In some embodiments, the method for estimating the time delay error may utilize an additional transmission pathway. The additional transmission pathway may be an alternative transmission pathway between the time source node and the time receiver node. The method may begin with transmitting a first time signal from the time source node to the time receiver node along a first transmission pathway and calculate an offset between the first time signal and the local clock. Next, a second time signal may be transmitted from the time source node to the time receiver node along an alternative transmission pathway and a corresponding offset between the second time signal and the local clock is calculated. The difference between the two offsets may be used for estimating the time delay error in the first time signal. In some embodiments, the alternative transmission pathway may comprise one or more intermediate nodes. Alternatively, the alternative transmission pathway may be a direct pathway (without intermediate node) between the time source A and time source B that is different from the first transmission pathway.

Referring back to FIG. 4, the nodes A 401, B 402 and C 403 may be nodes in a communication network. In some embodiments, the communication links among the nodes may use packet-based protocols as described above. The network may comprise any combination of local area and/or wide area networks using both wireless and/or wired communication systems. For example, the network may include the Internet, as well as mobile telephone networks. In one embodiment, the network uses standard communications technologies and/or protocols. Hence, the network may include links using technologies such as Ethernet, 802.11, worldwide interoperability for microwave access (WiMAX), 2G/3G/4G or Long Term Evolution (LTE) mobile communications protocols, Infra-Red (IR) communication technologies, and/or Wi-Fi, and may be wireless, wired, asynchronous transfer mode (ATM), InfiniBand, PCI Express Advanced Switching, or a combination thereof. Other networking protocols used on the network can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc.

The time source node A can be the same as the time server node as described in FIG. 1. The time signal provided by time source node A may be accurate time signals. For example, the time source node A 401 may receive time signals from global navigational satellites systems ("GNSS") such as GPS or GLONASS using a grandmaster clock and/or Global Positioning System (GPS) receiver modules. In some cases, the time source node A may broadcast Universal Coordinated Time (UTC) to other nodes (e.g., time receiver node B).

The time receiver node B can be the same as the time receiver node as described in FIG. 1. In some cases, the time receiver node B 402 may be a PTP or NTP receiving device such as a network interface card with hardware timestamping, or software capable of software timestamping.

The node C 403 can be any suitable network component/device capable of forwarding/relaying time signals received from node A to node B. In some cases, the node C may comprise multicast VPN receivers and forwarding transmitters which forwards the IP traffic from node A to node B. For instance, the time signal or data packet may be relayed by node C using any suitable network protocols or relayed using multi-hopping techniques as described above. In some cases, node C may be an existing device or network component already in the network. Alternatively, the node C may be a device configured or added to the network for estimating the transmission delay in the transmission pathway from the time source node A to the time receiver node B.

In some cases, as shown in FIG. 4, a time signal t, comprising UTC time and/or other time information (e.g., date) may be sent directly from the time source node A to the time receiver node B. In some cases, the same time signal may be simultaneously transmitted along an alternative transmission pathway, from the time source node A to the time receiver node B (i.e., from node A to node B via node C). Alternatively, the time signal may not be simultaneously transmitted along the two transmission pathways between node A and node B. The time signal transmitted from time source node A to the time receiver node B along the alternative transmission pathway may be different.

In some cases, the time signal such as the UTC time or other time information may be embedded in the PTP or NTP packet in a format specified by the PTP or NTP protocols. The protocols used in the different transmission pathways between the time source node A and the time receiver node B may or may not be the same.

The time signal may be used for testing a time distribution accuracy. The time signal, as described above, may comprise an accurate time signal such as UTC time. In some cases, a time signal may comprise a set of time data. For example, the time source may have two or more grandmaster clocks (e.g., three PTP GNSS disciplined atomic grandmaster clocks) and a time signal may include a set of source time data generated by the two or more grandmaster clocks. In some cases, an average value of the errors calculated using the set of data may be used to estimate the one-way transmission error which beneficially improves the accuracy of the estimation.

In some embodiments, the alternatively transmission pathway (i.e., indirect transmission pathway) between time source node A and time receiver node B may comprise one or more nodes C. The term alternative transmission pathway may refer to a pathway that is different to that of the transmission pathway of the time information sent directly from time source A 401 to receiver B 402. In some cases, the alternative transmission pathway may be an indirect transmission pathway. In some embodiments, the time signal transmitted along the indirect transmission pathway between two nodes is used for estimating the one-way transmission error in the direct transmission pathway between the same two nodes.

An indirect transmission pathway may comprise a plurality of sub-pathways connected by one or more intermediate nodes C. The one or more intermediate nodes C may be located at different locations. The one or more nodes C 403 can be any suitable network component/device (e.g., transceiver) capable of forwarding/relaying time signal received from an upstream node to a downstream node. The one or more nodes C may or may not comprise the same forwarding mechanisms. The protocols such as PTP or NTP used by the indirect transmission pathway may or may not be the same as those used by the direct transmission pathway between the time source node A and the time receiver node B. The one or more nodes C may be one or more existing devices or network components already in the network. Alternatively, one or more of the nodes C may be an additional device configured or added to the network for estimating the transmission delay in the transmission pathway from the time source node A to the time receiver node B.

The time signal may be sent from the time source node A to the time receiver node B via the direct transmission pathway with one-way transmission error $E_{AB}$ 404. The one-way transmission error in the delay along the alternative (i.e., indirect) transmission pathway, from A to B via one or more locations C 403 can be an accumulation of the transmission delay errors along the one or more sub-pathways, $E_{ACB}=E_{AC}+E_{CB}$ (405, 406). This may be obtained using the PTP or NTP protocol as described elsewhere herein.

The first time signal received via the direct transmission pathway and the second time signal received via the indirect transmission pathway may be processed by the time receiver node for calculating an estimated error in accuracy due to the one-way transmission delay from the time source node to the time receiver node. For example, the time receiver B 402 may measure a difference between the time signals distributed over the transmission pathways AB and ACB. This difference $E_P$ is used as the estimate of the error in accuracy due to the one-way transmission delay, $E_P=E_{AC}+E_{CB}-E_{AB}$ (405, 406, 404).

In an exemplary process for determining the estimated error, the operations may include:

(a) transmitting a first time signal $T_{AB}$ from a time source (e.g., A) to a time receiver (e.g., B), over the direct transmission pathway (e.g., path AB);

(b) calculating a clock/time offset between the arrival time $T_B$ at which the first time signal $T_{AB}$ is received (arrival time $T_B$ is generated by the local system clock at time receiver B) and the first time signal $T_{AB}$. As an example, the clock offset can be represented as $O_{AB}=T_{AB}-T_B$. In some cases, this clock offset can be measured using the PTP or NTP protocol as described in FIG. 1 such as by exchanging timestamps and estimated using a round-trip delay. In this case, the clock offset may be represented as $O_{AB}=(T_2-T_1)/2+(T_4-T_3)/2$ wherein $T_1$, $T_4$ are timestamps generated by the time receiver B and $T_2$, $T_3$ are timestamps generated by the time source A;

(c) transmitting a second time signal $T_{ACB}$ from the same time source (e.g., A) to the same time receiver (e.g., B), over the indirect transmission pathway (e.g., path ACB);

(d) calculating a clock offset between the arrival time $T'_B$ at which the second time signal $T_{ACB}$ is received (arrival time $T'_B$ is generated by the local system clock at time receiver B) and the second time signal $T_{ACB}$ As an example, the clock offset may be represented as $O_{ACB}=T_{ACB}-T'_B$;

(e) the estimated error in accuracy in the one-way transmission delay of the direct transmission pathway may then be calculated as the difference between the two clock offsets which can be represented as $E_P=E_{AC}+E_{CB}-E_{AB}=O_{ACB}-O_{AB}$. In some cases, the absolute value $|O_{ACB}-O_{AB}|$ may be used as the estimated error for the one-way transmission delay.

Figure 6:
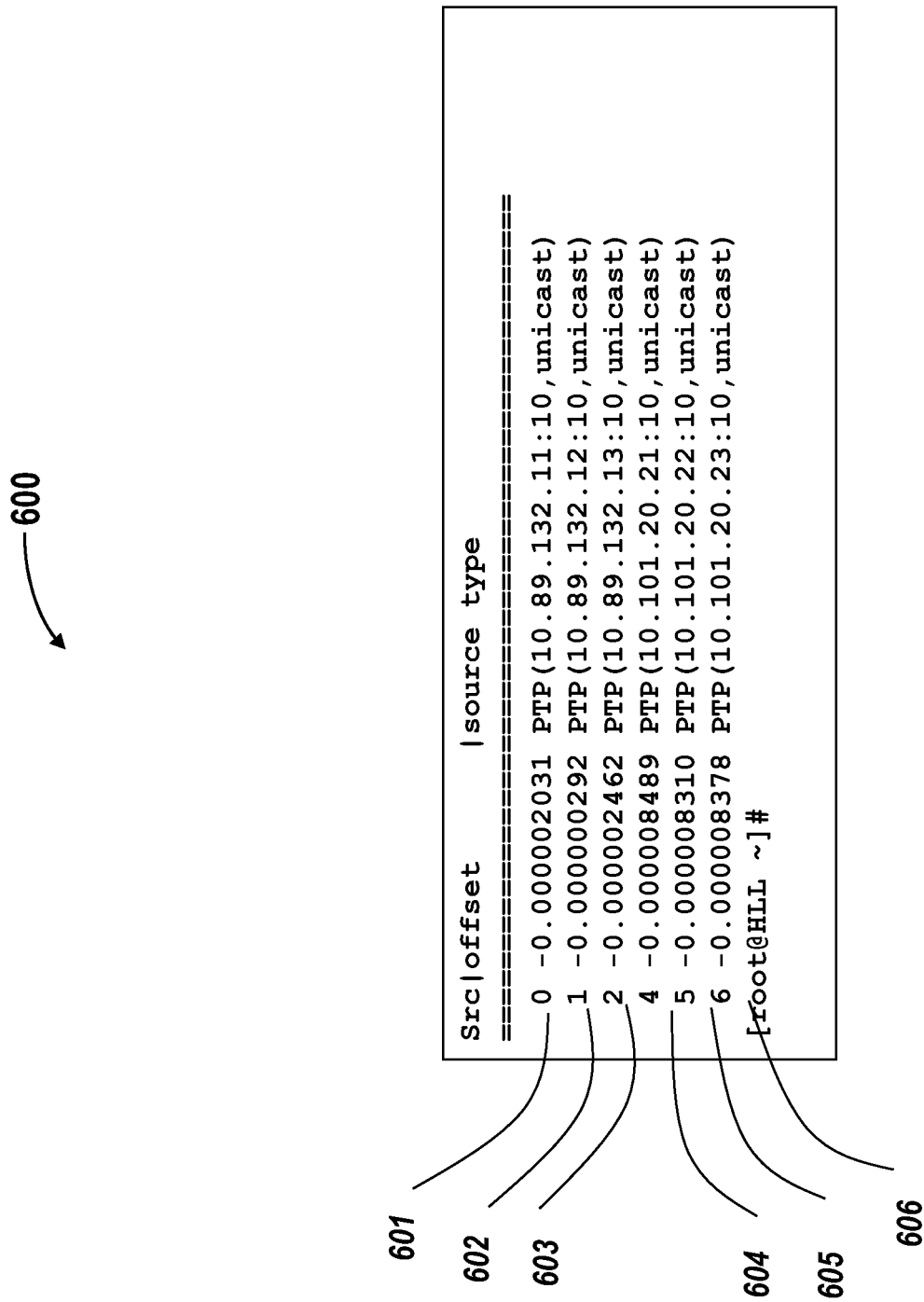
FIG. 6 shows an example of error in accuracy estimated using the method/system of the present disclosure.

FIG. 6 shows an example of estimated error in accuracy obtained using the aforementioned method. In some cases, a time signal may comprise a set of time data. For example, the time source may have two or more grandmaster clocks (e.g., three PTP GNSS disciplined atomic grandmaster clocks) and a time signal may include two or more source time data generated by the grandmaster clocks. In some cases, an average value of the errors calculated using the set of data may be used to estimate the one-way transmission error which beneficially improves the accuracy of the estimation. In the illustrated example, the time receiver device may be a PTP receiving device such as a network interface card with hardware timestamping, or software capable of software timestamping. The time receiver device measures time offsets (e.g., offsets 601, 602, 603) for the first set of time data received from the time source A (e.g., generated by the three grandmaster clocks at time source A) relative to the local network card clock. In some cases, an average value may be calculated for the plurality of offsets (average−1.5 µs), which acts as a datum.

The one or more nodes C along the indirect transmission pathway may each comprise a forwarding mechanism (e.g., multicast VPN receivers and forwarding transmitters) configured for forwarding the time signal. The time signal in the illustrated example is generated by the time source A and is forwarded to the time receiver B. In the illustrated example, the time receiver receives a second set of time data (e.g., generated by the three grandmaster clocks at time source A) via the indirect transmission pathway and measures the time offsets (e.g., offsets 604, 605, 606) for the second set of time data relative to the local network card clock. In the example, the average value of the second set of offsets is calculated (average−8.5 µs), The time receiver may then calculate the time difference between the two sets of three PTP signals which is used as the estimated error in accuracy due to the one-way delay in the direct transmission path. The estimated error in the example is the difference between the two average offsets (−1.5)−(−8.5)=7 µs.

The presented method and system may beneficially provide a metric or error bound for testing the time distribution across a network. In particular, the estimated error may be used to determine whether time signals have been correctly delivered to a remote site without requiring addition hardware set-up to the network. For instance, the estimated error of time accuracy may be used as a threshold to determine whether time has been distributed correctly. The quality of time service or time delivery can be monitored in real-time without the need to visit the remote site. The time signals for testing the time distribution accuracy can be generated at pre-determined frequency (e.g., every second, every minute, hourly, daily, etc.) over any specified time period.

Figure 5:
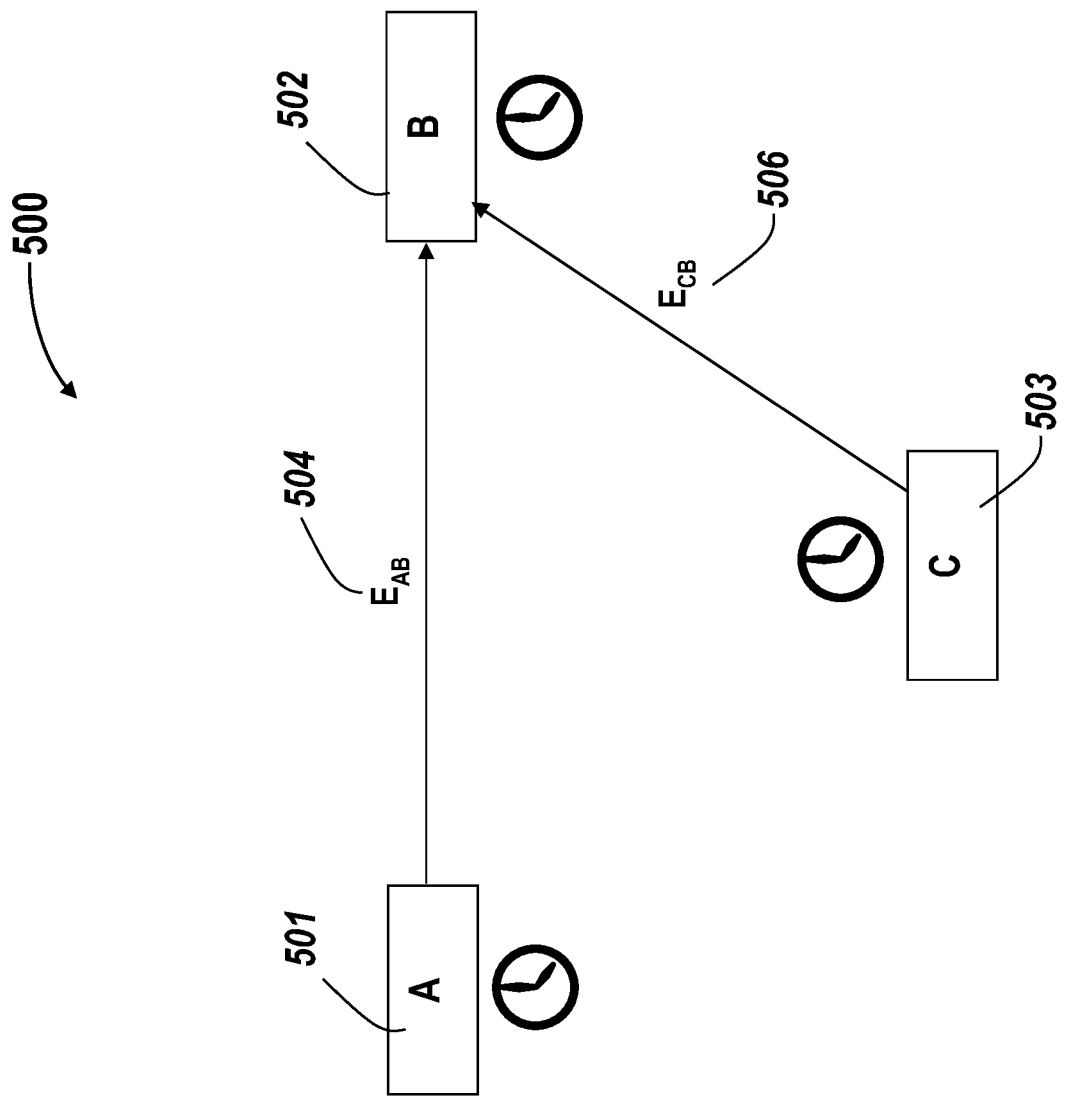
FIG. 5 an example of a deployment scenario in which the provided methods can be applied for testing the time distribution accuracy.
Figure 7:
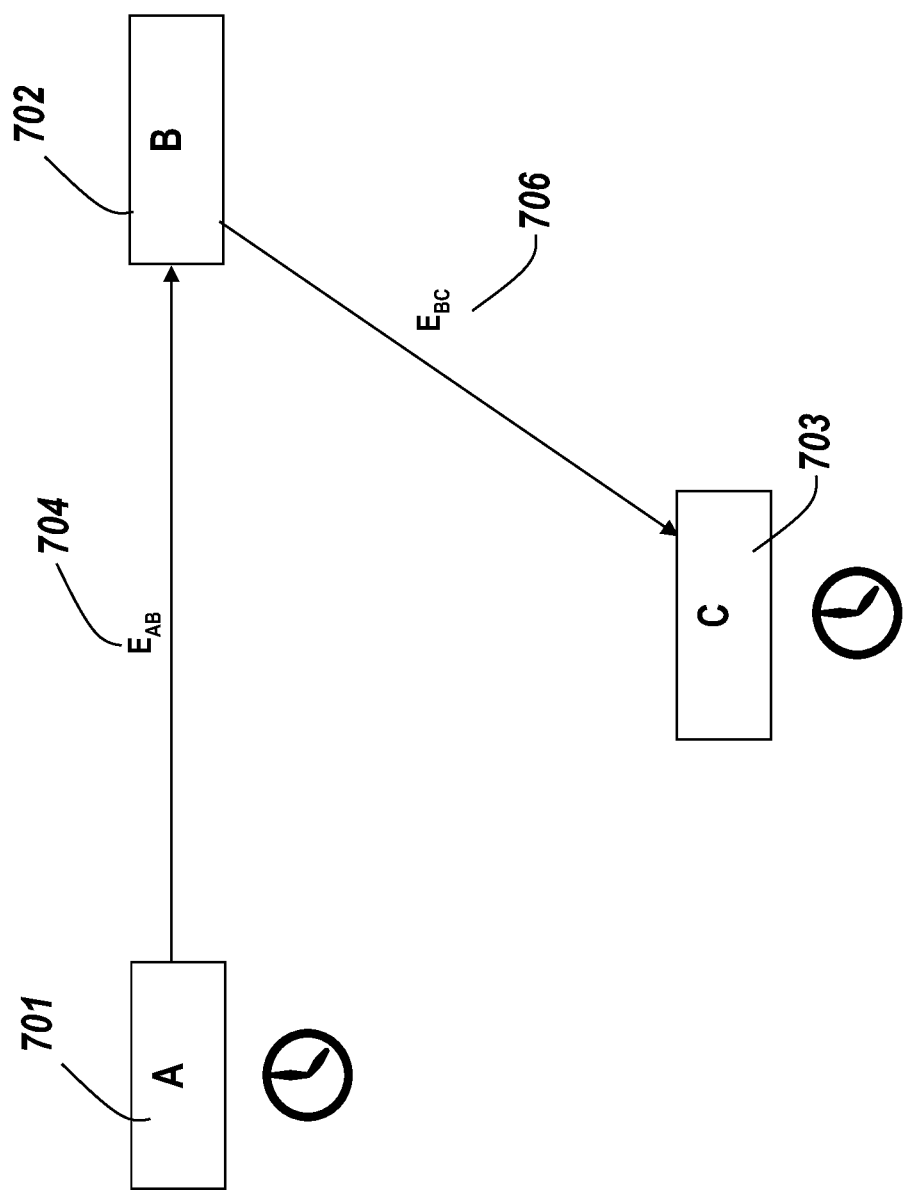
FIG. 7 an example of a deployment scenario in which the provided methods can be applied for testing the time distribution accuracy.
Figure 8:
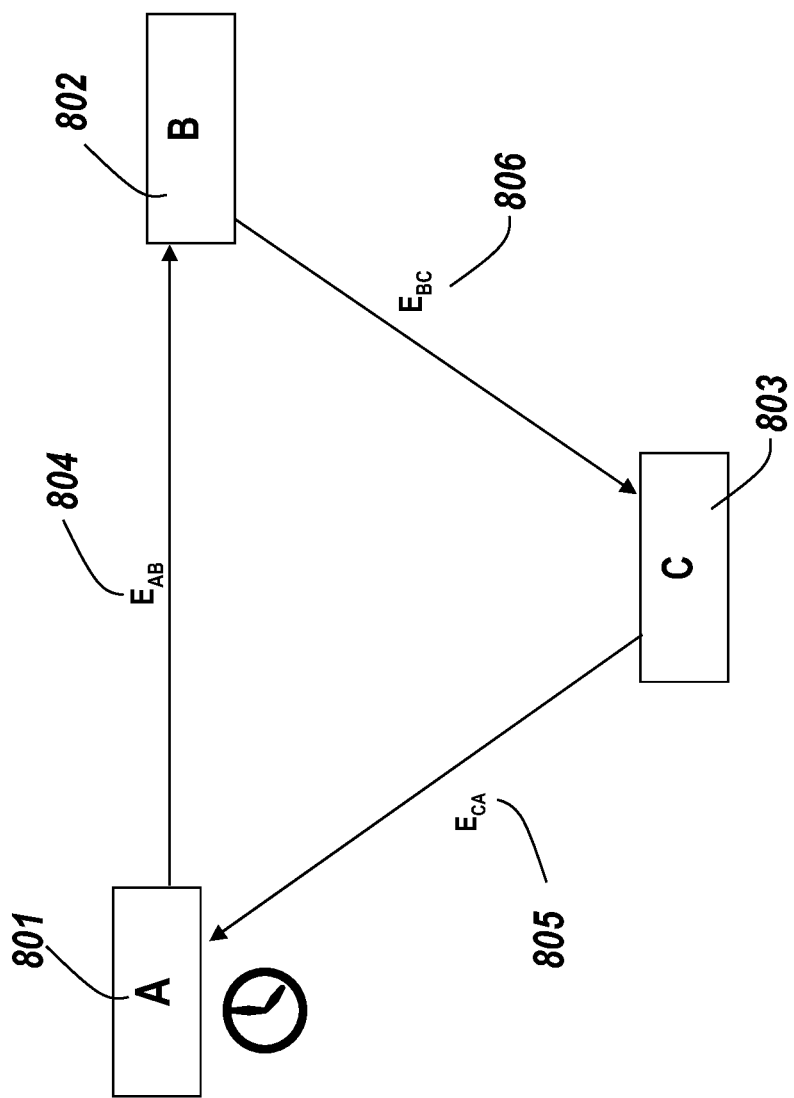
FIG. 8 another example of a deployment scenario in which the provided methods can be applied for testing the time distribution accuracy.

It should be noted that various different deployment scenarios can be employed for estimating the time distribution. FIG. 5, FIG. 7 and FIG. 8 show various embodiments in which the provided methods can be applied for testing the time distribution accuracy.

In some embodiments, the alternative transmission pathway introduced for estimating the error bound may not include a plurality of sub-pathways. In the deployment scenario illustrated in FIG. 5, a first set of time signals may be sent from time source A 501 to time receiver B 502 along a first direct transmission pathway such as using the NTP mechanism, and the first time signal may be received by the time receiver B with a transmission delay error $E_{AB}$ 504. A second sets of time signals may be transmitted from one or more time sources C 503 directly to time receiver B along one or more alternative transmission pathways using a protocol such as PTP or NTP, and the second time signal may be received by the time receiver B with a transmission delay error $E_{CB}$ 506. The estimated error in the transmission pathway between A and B may be calculated as the time difference between the first and second sets of time signals distributed over the transmission pathways AB and CB using the method described in FIG. 4. In this scenario, the time source C may comprise one or more grandmaster clocks for generating the second time signal. In some cases, the time source C may include two or more grandmaster clocks (e.g., three PTP GNSS disciplined atomic grandmaster clocks) and a time signal may include a set of source time data generated by the grandmaster clocks.

In another deployment scenario illustrated in FIG. 7, a time signal such as a set of PTP time signals may be sent from time source A 701 to time receiver B 702 along a direct transmission pathway (AB) such as using the NTP mechanism, and the set of PTP time signals may be received by the time receiver B with a transmission delay error $E_{AB}$ 704. The time receiver B 702 may forward the set of PTP time signals to one or more time sources C (703) using a protocol such as PTP or NTP, and the set of PTP time signals may be received by the time sources C with a transmission delay error $E_{BC}$ 706. The estimated error may then be calculated by the time source node C as the time difference between the set of PTP time signals distributed over the transmission pathway ABC and the time of the local clock at the time source C. In this scenario, the receiver node B may be a PTP receiving and transmitting device capable of forwarding the PTP signals to the time source node C.

In should be noted that the different deployments such as those described in FIG. 4, FIG. 5 and FIG. 7 and be used alone or in combination. These deployments can be combined in various different ways depending on the software/hardware capability of the nodes. For instance, local clock of the one or more nodes C may comprise a local hardware or device clock such as NIC hardware time or host device (e.g., CPU) clock, or one or more grandmaster clocks. In the scenarios when all of the time sources C are equipped with grandmaster clocks, deployment described in FIG. 5 may be applied. Alternatively, when at least one of the nodes C does not comprise a grandmaster clock, the at least one node C may be used as an intermediate node C in a similar fashion as those described in FIG. 4 while others may function in a similar way as those described in FIG. 5.

In a deployment scenario illustrated in FIG. 8, a time signal (e.g., set of PTP time signals) may be sent from time source A 801 to time receiver B 802 along a direct transmission pathway (e.g., AB) such as using the NTP mechanism, and the time signal may be received by the time receiver B with a transmission delay error $E_{AB}$ 804. The time receiver B 802 may forward the time signal to one or more nodes C (803) using a protocol such as PTP or NTP, and the one or more nodes C may further forward the time signal back to time source A. The estimated error may then be calculated by the time source node A as the time difference between the set of PTP time signals distributed over the transmission pathway ABC and the time of the local clock at the origin time source A. In this case, the receiver node B and the one or more nodes C may be a PTP receiving and transmitting device capable of forwarding the PTP signals to the downstream device.

In some cases, the time distribution testing can be performed without interrupting the network traffic or service. The time distribution may be tested dynamically without causing service disruption. In some cases, the testing of time distribution over a network may be performed automatically according to a scheduled testing plan. The testing plan may comprise, for example, a scheduled date, frequency, nodes or transmission pathways to be tested, or an action to be performed upon detecting a time error beyond a threshold. In some cases, the estimated error of time accuracy may be used as the threshold to determine whether time has been distributed correctly. In some cases, the methods or one or more components of the system used for testing the time distribution may be dynamically updated or changed based on the change of the network topology, hardware/software capability of a node and various other real-time conditions or deployment conditions.

The one or more nodes of the network can be various types of computing devices such as personal computers, tablet computers, smart phones, set top boxes, desktop computers, laptops, gaming systems, servers, data centers, and various other devices or systems. A plurality of other devices or components can establish a connection through the network. A node may be any device equipped with communication capabilities. The communications may be wired or wireless communications. The node may be operating over various technologies such as Worldwide Interoperability for Microwave Access (WiMAX) and infrastructure IEEE 802.11 variants, such as IEEE 802.11a/b/g/n/ac, Global System for Mobile communication (GSM), Universal Mobile Telecommunications System (UMTS), High Speed Downlink Packet Access (HSDPA), Code Division Multiple Access (CDMA), Long Term Evolution (LTE), and various others as described elsewhere herein. In some cases, a node may be a Bluetooth or Wi-Fi enabled device, such as laptops, cellular phones, Personal Digital Assistant (PDA), Smartphone, HSDPA terminal, CSMA terminal and various other access terminals.

Various methods of the present disclosure may be implemented by software, hardware or a combination of both. The provided system can have one or more processors and at least one memory for storing program instructions. The processors may be located at the time receiver or time source. The processors may be part of the receiver or source. Alternatively, the processors may be located remote to the receiver or source. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the algorithms for calculating the estimated error in accuracy or performing time distribution testing can be implemented in hardware components (e.g., ASICs, special purpose computers, or general purpose computers), software or combinations of hardware and software While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for estimating an error bound of one-way time distribution delay in a network comprising:
   a) receiving, a first time signal transmitted along a first transmission pathway;
   b) receiving, a second time signal transmitted along a second transmission pathway, wherein the first transmission pathway and the second transmission pathway are different transmission pathways between a time receiver and a time server, and wherein the first time signal and the second time signal are provided by a same time source at the time server without introducing additional hardware or additional clock;
   c) deriving, by the time receiver, a first time offset between the first time signal and a corresponding arrival time generated by a clock of the time receiver, and a second time offset between the second time signal transmitted along the second transmission pathway and a corresponding arrival time generated by the clock of the time receiver; and
   d) determining an error bound of asymmetric delay along the first transmission pathway based on an absolute value of a difference between the first time offset and the second time offset.

2. The method of claim 1, wherein the first time signal is a GNSS or GPS time signal.

3. The method of claim 1, wherein the time source comprises a plurality of grandmaster clocks.

4. The method of claim 3, wherein the first time signal or the second time signal comprises a first set of time data or a second set of time data generated by the plurality of grandmaster clocks.

5. The method of claim 4, wherein the first time offset or the second time offset is an average value calculated based on the first set of time data or the second set of time data.

6. The method of claim 1, wherein the clock of the time receiver is a slave clock synchronized with the time source.

7. The method of claim 1, wherein the second transmission pathway comprises a plurality of sub-pathways connected by one or more intermediate node devices.

8. The method of claim 7, wherein at least one of the one or more intermediate node devices comprises a forward mechanism for forwarding the second time signal along the second transmission pathway.

9. The method of claim 7, wherein at least one of the one or more intermediate node devices comprises a grandmaster clock and the second time signal is provided by the grandmaster clock.

10. The method of claim 1, wherein the first time signal or the second time signal is received using a PTP or NTP protocol.

11. A system for estimating an error bound of testing one-way time distribution delay in a network comprising;
    a) a memory for storing a set of instructions; and
    b) one or more processors configured to execute the set of instructions to:
        i) receive a first time signal transmitted along a first transmission pathway;
        ii receive a second time signal transmitted along a second transmission pathway, wherein the first transmission pathway and the second transmission pathway are different transmission pathways between a time receiver and a time server, and wherein and wherein the first time signal and the second time signal are provided by a same time source at the time server without introducing additional hardware or additional clock;

iii) derive a first time offset between the first time signal and a corresponding arrival time generated by a clock of the time receiver, and a second time offset between the second time signal transmitted along the second transmission pathway and a corresponding arrival time generated by the clock of the time receiver; and iv) determine an error bound of asymmetric delay along the first transmission pathway based on an absolute value of a difference between the first time offset and the second time offset.

12. The system of claim 11, wherein the first time signal is a GNSS or GPS time signal and is received using a PTP or NTP protocol.

13. The system of claim 11, wherein the time source comprises a plurality of grandmaster clocks.

14. The system of claim 13, wherein the first time signal or the second time signal comprises a first set of time data or a second set of time data generated by the plurality of grandmaster clocks.

15. The system of claim 14, wherein the first time offset or the second time offset is an average value calculated based on the first set of time data or the second set of time data.

16. The system of claim 11, wherein the clock is a slave clock to be synchronized with the time source of the time server and is at the time receiver.

17. The system of claim 11, wherein the second transmission pathway comprises a plurality of sub-pathways connected by one or more intermediate node devices.

18. The system of claim 17, wherein at least one of the one or more intermediate node devices comprises a forward mechanism for forwarding the second time signal along the second transmission pathway.

19. The system of claim 18, wherein the second time signal is provided by at least one of the one or more intermediate node devices.

20. The system of claim 19, wherein the at least one intermediate node device comprises a plurality of grandmaster clocks.

* * * * *